United States Patent
Lau et al.

(10) Patent No.: US 9,957,648 B2
(45) Date of Patent: May 1, 2018

(54) WOVEN INFORMATION BEARING DEVICES

(71) Applicant: SINOWIDE TRADING LIMITED, Kowloon, Hong Kong (CN)

(72) Inventors: Tak Wai Lau, Hong Kong (CN); Wing Hong Lam, Hong Kong (CN)

(73) Assignee: SINOWIDE TRADING LIMITED, Hong Kong (CN)

( * ) Notice: Subject to any disclaimer, the term of this patent is extended or adjusted under 35 U.S.C. 154(b) by 0 days. days.

(21) Appl. No.: 15/304,308

(22) PCT Filed: Apr. 17, 2015

(86) PCT No.: PCT/IB2015/052805
§ 371 (c)(1),
(2) Date: Oct. 14, 2016

(87) PCT Pub. No.: WO2015/159260
PCT Pub. Date: Oct. 22, 2015

(65) Prior Publication Data
US 2017/0037546 A1    Feb. 9, 2017

(30) Foreign Application Priority Data
Apr. 17, 2014   (HK) .................... 14103743

(51) Int. Cl.
*G06K 7/10* (2006.01)
*D03D 1/00* (2006.01)
*D03D 15/00* (2006.01)
*G06K 19/02* (2006.01)
*G06K 19/06* (2006.01)

(52) U.S. Cl.
CPC ....... *D03D 1/0011* (2013.01); *D03D 15/0033* (2013.01); *G06K 7/10861* (2013.01); *G06K 19/027* (2013.01); *G06K 19/06037* (2013.01)

(58) Field of Classification Search
USPC ............................................ 235/462.11, 494
See application file for complete search history.

(56) References Cited

U.S. PATENT DOCUMENTS

| 6,494,362 B1 | 12/2002 | Harmon | |
| 2008/0009960 A1 | 1/2008 | Jinlian et al. | |
| 2012/0294624 A1* | 11/2012 | Noh | H04B 10/2503 398/142 |

FOREIGN PATENT DOCUMENTS

| CN | 1898426 A | 1/2007 |
| CN | 102982724 A | 3/2013 |
| DE | 4341532 C1 | 4/1995 |

(Continued)

OTHER PUBLICATIONS

International Search Report for PCT/IB2015/052805 dated Aug. 21, 2015.

(Continued)

*Primary Examiner* — Ahshik Kim
(74) *Attorney, Agent, or Firm* — Nixon Peabody LLP; Jeffrey L. Costellia (57) ABSTRACT

A woven information bearing device comprising a plurality of woven elements arranged to define a woven information bearing pattern, wherein the woven elements include N woven information bearing elements, N being an integer number; and wherein said N woven information bearing elements define N or more than N data elements.

18 Claims, 7 Drawing Sheets

(56) References Cited

FOREIGN PATENT DOCUMENTS

| | | |
|---|---|---|
| EP | 1085114 A2 | 3/2001 |
| EP | 0919650 B1 | 6/2004 |
| ES | 2167156 A1 | 5/2002 |
| GB | 2179319 B | 5/1990 |

OTHER PUBLICATIONS

European Search Report for PCT/IB2015/052805 dated May 22, 2017.
Original First Examination Report related to Chinese Patent Application No. 201580019907.5 together with a Search Report—dated Feb. 1, 2018.
Machine Translation of the First Examination Report related to Chinese Patent Application No. 201580019907.5—dated Feb. 1, 2018.

* cited by examiner

WOVEN INFORMATION BEARING DEVICES

FIELD

The present disclosure relates to woven information bearing devices, and more particularly to woven information bearing devices carrying machine readable codes.

BACKGROUND

Woven information bearing devices are widely in shoes, clothing and apparel products. Woven information bearing devices are information bearing devices in which data or information are embedded in woven elements. Common examples of woven information bearing devices include woven tags having woven barcodes and woven QR® codes. While woven information bearing devices are useful, known information bearing devices are not entirely adequate to meet modern day requirements. These woven information bearing devices are woven to accommodate the characteristics of popular printed code patterns and the data storage of these woven information bearing devices is not optimized.

DISCLOSURE

A woven information bearing device comprising a plurality of woven elements arranged to define a woven information bearing pattern is disclosed. The woven elements include N woven information bearing elements, N being an integer number. The N woven information bearing elements define N or more than N data elements. This may substantially increase data density in woven information bearing device and is highly advantageous. The increase in data density is particularly noticeable for instance when a woven information bearing element is a single woven element.

For example, data density may be enhanced by having multiple data sections on a single woven information bearing element. For example, a data section may be coded or formed with a data symbol or a data value. A single woven element may have more than one data meaning to further enhance data density.

The data elements may be arranged orderly into a matrix of linear rows and aligned columns. The data elements may be arranged into linear rows with data elements on different rows laterally shifted or offset to increase data formatting variations.

A woven information bearing element may be coded into or formed with a plurality of data sections each representing a unique data symbol or a unique data value. Adjacent data symbols are preferably visually or optically distinguishable to facilitate expeditious data recovery. For example, each data section may be coded into or formed with data symbols of contrasting colours, contrasting surface textures and surface patterns.

Adjacent data sections may be delineated by a salient or pre-defined boundary outline such as a spiral outline to facilitate expeditious and accurate extraction. Data sections may have different shapes and/or areas. Woven information bearing elements may have different sizes and/or widths to promote variation.

Throughout this specification, the terms "woven information bearing element", "woven data element" and "woven data bearing element" are used interchangeably where appropriate or necessary to refer to a woven element that bears information or data, and the terms "woven data weft element", "data-bearing weft element" and "weft data element" are used interchangeably where appropriate or necessary to refer to a weft woven element that bears information or data. Moreover, throughout this specification, the term "data section" is used interchangeably where appropriate or necessary with the term "data element", in which data sections and data elements are coded or formed with data values or data symbols.

FIGURES

Example of woven information bearing devices of the present disclosure will be described by way of examples with reference to the accompanying Figures, in which.

DESCRIPTION

A typical woven article comprises interlacing warp and weft yarns. In general, warp yarns define warp members which are distributed in a first direction (the "longitudinal direction") and weft yarns define weft members which are distributed in a second direction (the "transverse" or "transversal" direction) orthogonal or substantially orthogonal to the first direction. Warp and weft members are interlaced to define warp and weft elements such that a warp element is defined between two immediately adjacent weft members and a weft element is defined between two immediately adjacent warp members. Each warp or weft yarn may comprise a single thread or a bundle of threads. While reference is made in this disclosure to 'woven' or 'weaving', such a reference is not intended to limit to 'weaving' using yarns, threads or other fabrics and is intended to include weaving using materials such as plastic or polymers without loss of generality.

In the traditional art of weaving, a weft yarn is horizontal on a weaving machine at the time of weaving and a warp yarn is vertical or orthogonal to the weft yarn. In this disclosure, however, warp elements are not necessarily vertical and weft elements are not necessarily horizontal since the orientation of a woven article will change according to the manner of holding or attachment. Therefore, reference to the terms 'warp', 'warp members' or 'warp elements' in this disclosure is not intended to limit to components of a specific orientation but is intended to be distinguished from 'weft, 'weft members' or 'weft elements' which are orthogonal or substantially orthogonal.

Figure 1:
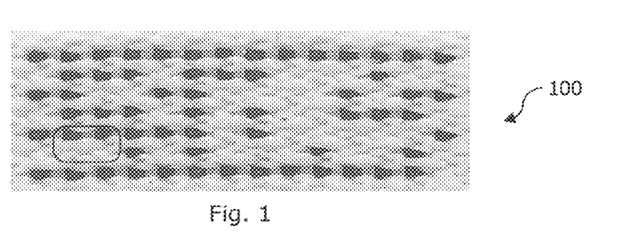
FIG. 1 is an image of an example woven information bearing device according to the present disclosure.

An example woven information bearing device depicted in FIG. 1 is in the form of a woven label 100. The example woven label 100 is constructed from warp yarns and weft yarns which are interlaced to form weft elements 102, 112 and warp elements 104, 114 as shown in the schematic diagram of FIG. 1A. The woven label 100 includes an inner portion 106 which is surrounded by an outer portion 108. The inner portion 106 defines a data bearing region. The weft elements inside the data bearing region 106 comprises non-data-bearing weft elements (not shown) and data-bearing weft elements 112. The data-bearing weft elements 112 in the data bearing region 106 are arranged into a matrix comprising I rows and J columns of woven data elements, where I and J are integers. The warp elements 114 in the data bearing region 106 of this example do not carry data or data coding and are used to facilitate and maintain alignment of the data-bearing weft elements 112 into a rectangular matrix comprising longitudinally running columns and transversely running rows. More particularly, each one of the I rows of data elements has J data-bearing weft elements 112, making a total of D=I×J number of weft data elements available for data coding or data formatting, where D is the number of total data elements contained within the data bearing region 106.

Figure 1A:
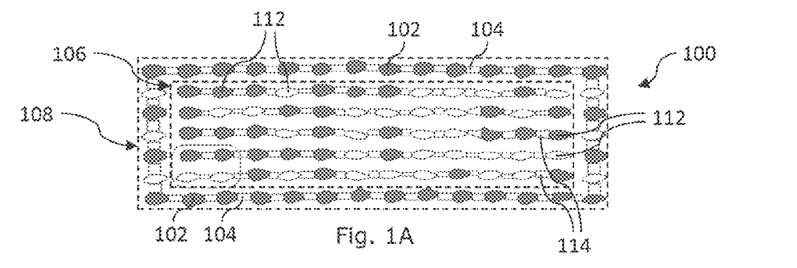
FIG. 1A is a schematic diagram showing woven elements contained in the device of FIG. 1.

In this example, there are 60 data-bearing weft elements 112 which are arranged into 5 rows and 12 columns in a data bearing region having an area of 17 mm$^2$ such that I=5, J=12 and D=60. Each data-bearing weft element 112 in the data bearing region 106 is binary coded into either 'white' or 'light' (for example, corresponding to '0') or 'black', 'grey' or 'dark' (for example, corresponding to '1'). The data-bearing weft elements 112 are in two different shapes, namely, a first type 112a of a first shape (rice shape) representing a '0' and a second type 112b of a second shape (tear drop shape) representing a '1'. Thus, data-bearing weft elements 112 bearing the same data value have substantially the same shape and dimensions while data-bearing weft elements 112 bearing different data values have different shapes and dimensions. Data-bearing weft elements, such as data-bearing weft elements of first type 112a, may have similar or identical colour as their surrounding non-data-bearing woven elements; hence, data-bearing weft elements may be indistinguishable from the non-data-bearing woven elements in appearance and data-bearing weft elements may generally have any shape and dimensions.

In some embodiments, data-bearing weft elements 112 representing different data values may have uniform or substantially uniform surface shape and dimensions.

Figure 1B:
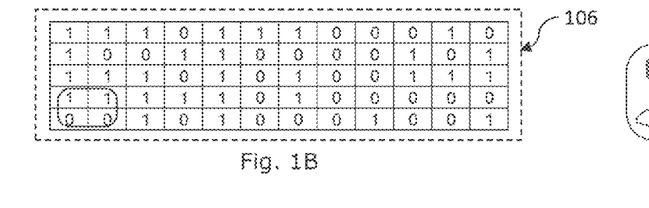
FIG. 1B is a table showing data tabulation corresponding to coded data embedded in the example data bearing region of FIG. 1.

A tabulation of data in '0' and '1' format is depicted in FIG. 1B. The data corresponding to the small rounded rectangle on the lower left corner of the data bearing region 106 of FIG. 1A is shown with a corresponding rounded rectangular window on FIG. 1B.

Figure 1C:
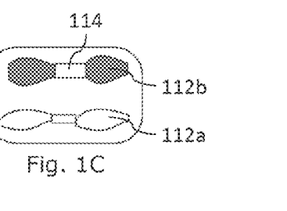
FIG. 1C is an enlarged view showing a portion of data bearing region of FIG. 1A as delineated.

An enlarged view of the woven elements contained within the rounded rectangular window on FIG. 1B is depicted in FIG. 1C. The example selection window shown in FIG. 1A and the matrix table of FIG. 1B are not generally or actually visible or present on the pattern defining the data bearing region but are only shown to assist understanding.

The data represented by the data-bearing weft elements 112 can be used in any ways according to applications without loss of generality.

In this example, each data-bearing weft element 112 forming the data bearing region is a woven information bearing element carrying one binary coded data element and the D data-bearing weft elements can therefore carry a maximum of D binary coded data elements.

The outer portion 108 comprises weft and warp elements which are arranged to form a reference frame or a reference grid. The reference frame or the reference grid in this example is in the shape of a closed rectangle to facilitate recovery of data in the data bearing region 106 when the woven label 100 is subject to lateral and/or longitudinal distortion.

To produce the woven label 100, weft yarns having black and white portions are machine woven and coded according to a predetermined spatial distribution or tabulation pattern corresponding to the distribution of data as depicted in the data matrix table of FIG. 1B.

A data reading template may be used to retrieve or read data encoded on the device 100 during use. As data elements may for example be woven according to a predetermined data table such as that of FIG. 1B, a data reading template may be constructed according to the data tabulation and spatial distribution characteristics at the time when the data table are available. An example data template may contain a plurality of data reading cells to correspond to the same plurality of data elements contained in the device 100. The data reading cells may have the same or different sizes but their relative spacing and distribution would be defined by the spatial distribution properties of the predetermined data tabulation. In some embodiments, a data reading cell may be larger than the size of a woven data element. Where the data reading cell has a size larger than that of the woven data element, the data value to be read out of that data reading cell may be taken as the overall data property of that data cell which is expected to be dominant by that woven data element occupying that data reading cell. In some embodiments, a data reading cell may be smaller than the size of a woven data element. Where the data reading cell has a size smaller than that of the woven data element, the data value to be read out of that data reading cell may be taken as the overall data property of the data cell which is occupied by that woven data element.

Figure 1D:
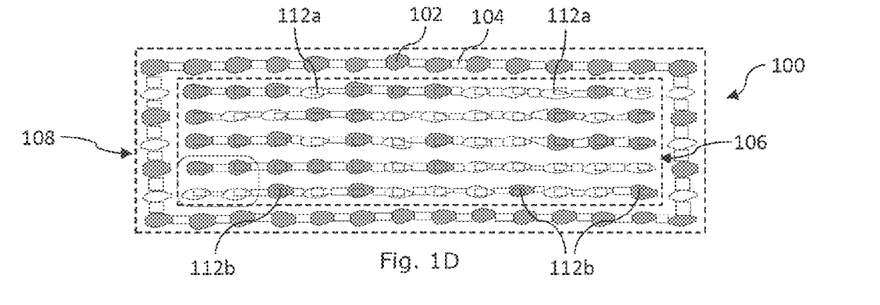
FIG. 1D is a schematic view showing superimposition of a data reading template onto the example data bearing region of FIG. 1.

An example data reading template for retrieving data which are encoded in the data bearing region of the device 100 of FIG. 1A may comprise data reading cells which are arranged into a matrix of 5 rows and 12 columns, with inter-cell spacing corresponding to that of the data tabulation. When the data reading template is applied to the data bearing region 106 of the device of FIG. 1, the individual data cells on the data reading template will appear as small rectangular boxes overlapping with the data elements, as depicted in FIG. 1D. In some embodiments, the woven elements on the outside portion 108 may be used as alignment device to facilitate alignment of the data reading template and the data bearing region 106.

In use, the woven label 100 may be attached to merchandise such as a shoe, a clothing item or an article such as a bag or purse. The woven label 100 for example may be part of a tag which is attached to merchandise. A user may then make inquiry by utilizing the woven label 100 as an information source and according to example flows depicted in FIGS. 9, 9A and 9B.

Figure 2:
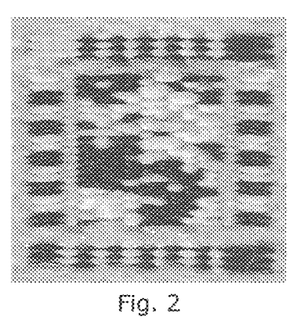
FIG. 2 is an image of an example woven information bearing device according to the present disclosure.
Figure 2A:
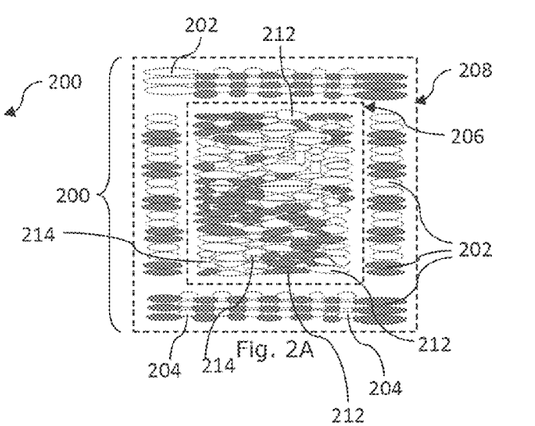
FIG. 2A is a schematic diagram showing woven elements contained in the device of FIG. 2.

A woven label 200 as an example of a woven information bearing device is depicted in FIG. 2. The woven label 200 is constructed from warp yarns and weft yarns which are interlaced to form weft elements 202, 204, 212 and warp elements 214 as depicted in the schematic diagram of FIG. 2A. The woven label 200 includes an inner portion 206 which is surrounded by an outer portion 208. The inner portion 206 defines a data bearing region comprising the weft elements 212 and the warp elements 214. As depicted in FIG. 2A, the woven elements 202, 204, 212, 214 are distributed inside and outside the data bearing region 206 and do not have uniform shape and/or dimensions. In addition, the woven information bearing elements 212, 214 which are distributed inside the data bearing region 206 do not have uniform shape and/or dimensions. As depicted in the enlarged view of an excerpted portion of the data bearing region 206 shown in FIGS. 2B and 2C, there are a total of 22 woven weft elements 212 to represent 30 data elements.

In this example, data elements are coded with reference to a data grid. A data grid is also referred to herein as a data coding grid or data defining grid. The example data grid comprises a plurality of intersecting lines which cooperate to partition the data bearing region 206 into a plurality of data cells. Each data cell defines a data element carrying a data symbol or a data value. In the example of FIG. 2A, as depicted in the data tabulation of FIG. 2D, the data cells are arranged into a rectangular matrix and have uniform shape and dimensions. The data symbol or data value defined by a data element of a data cell is characterised by representative property or properties of a woven information bearing element or woven information bearing elements contained within that data cell. For example, a data cell coded in 'black' represents a data symbol '1' and a data cell coded in 'white' represents a data symbol '0'. Where a data cell is not fully characterised by representative property or properties of a woven information bearing element, the data symbol or data value of that data cell will be determined by reference to the overall data property contained within that data cell. In the schematic diagrams, a 'black' data cell is actually coloured in grey to facilitate showing of grid lines and reference lines.

Figure 2B:
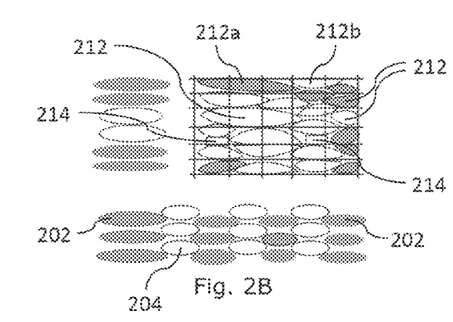
FIG. 2B is an enlarged view showing a portion of data bearing region of FIG. 2.
Figure 2C:
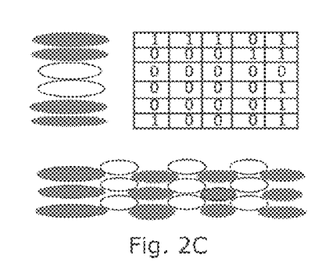
FIG. 2C is a table showing data tabulation corresponding to coded data embedded in the example data bearing region of FIG. 2B.

For example, in the excerpted data portion comprising 6 rows and 5 columns of data cells as depicted in FIG. 2B, a black weft element 212a on the top left corner of the data coding grid spreads across three consecutive data cells from left in a first row of the data coding grid. While the black weft element 212a does not fully fill each one of the three data cells, the overall property of each of the three data cells is dominant by the black weft element. As a black data element represents the data symbol and a white data element represents the data symbol '0' in this example, the three consecutive data cells represent data "111". The third data cell from the left edge on the first row is occupied by a larger portion of the black weft element and a smaller portion of a white weft element projecting from the fourth data cell. The data symbol or data value carried by this third data cell is determined by its overall property which is dominant by that of the black weft element and therefore carries the data value or data symbol represented by the black weft element. The fourth data cell from the left edge on the first row is occupied by a larger portion of the white weft element 212b and a smaller portion of the black weft element 212a spilled over from the third data cell. The data symbol or data value carried by this fourth data cell is determined by its overall property which is dominant by that of the white weft element and therefore carries the data value or data symbol represented by the white weft element. Similarly, the fifth data cell from the left edge on the first row has the data property of a black woven element since it is occupied by a larger black woven element portion and a smaller white woven element portion. The woven elements on the first row of the data coding grid of FIG. 2 therefore collectively define a carry data "11101".

While most of the woven data elements depicted in FIG. 2 are weft elements, some of the woven data elements are warp elements. Referring to the first and fourth data cells from the left edge on the fourth row, the rectangular shaped warp elements 214 represents a data value.

As depicted in FIGS. 2, 2A and 2B, the woven data elements are somewhat randomly or irregularly disposed to form the data bearing region and define a woven information bearing pattern. Therefore, woven data elements, also known as woven information bearing elements or woven data bearing elements herein, are not necessarily arranged into a linear row or a linear column as the example of FIG. 1.

By formulating a woven data element to spread across a plurality of data cells, for example, as illustrated by the example of the long black weft element on the first data row which spreads across a plurality of data cells on a data cell row or by the example of a white weft element on the fourth column from the left edge which spreads across the third and fourth data rows from the top edge, each woven data element can represent a plurality of data elements and the data elements can represent data symbols or data values without loss of generality.

Figure 2D:
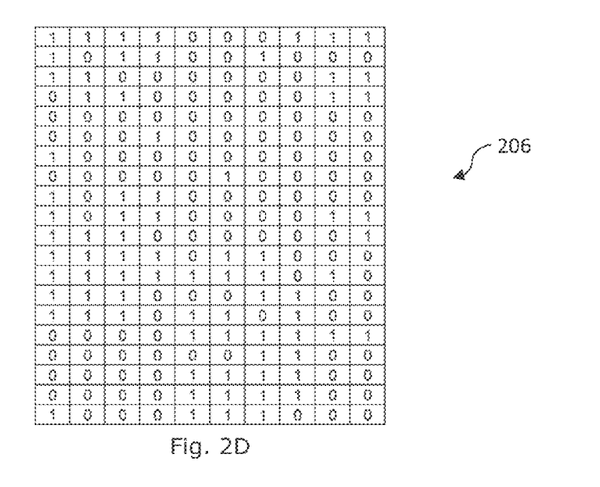
FIG. 2D is a table showing data tabulation corresponding to coded data embedded in the example of FIG. 2.

To produce the example woven label 200, warp and weft yarns of black and white colours are woven according to a spatial distribution corresponding to the distribution of data in the data matrix of FIG. 2D. The warp and weft elements are of non-uniform or irregular shapes, and/or of non-uniform or irregular sizes. This facilitates coding flexibility such that a single woven element can represent one or more than one data symbols. To promote data accuracy, error correction coding schemes may be applied to data coding and to facilitate data retrieval where appropriate or necessary.

Figure 3:
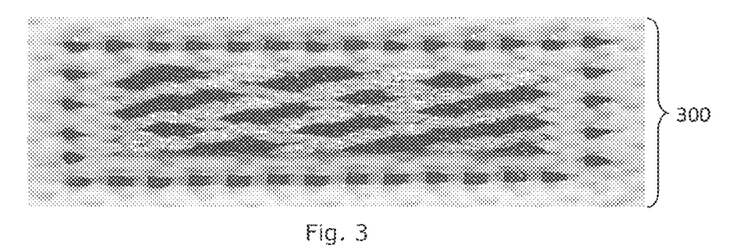
FIG. 3 is an image of an example woven information bearing device according to the present disclosure.
Figure 3A:
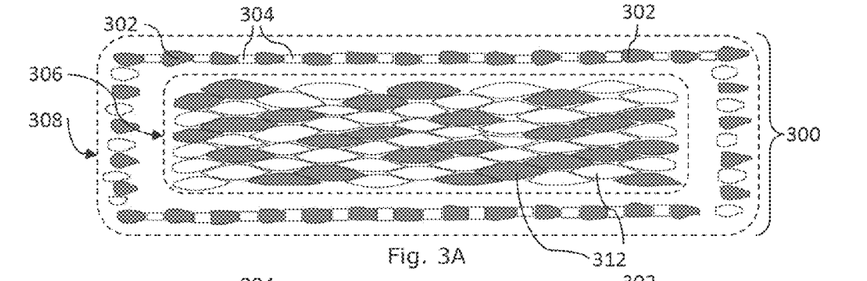
FIG. 3A is a schematic diagram showing the woven elements of the woven device of FIG. 3.
Figure 3B:
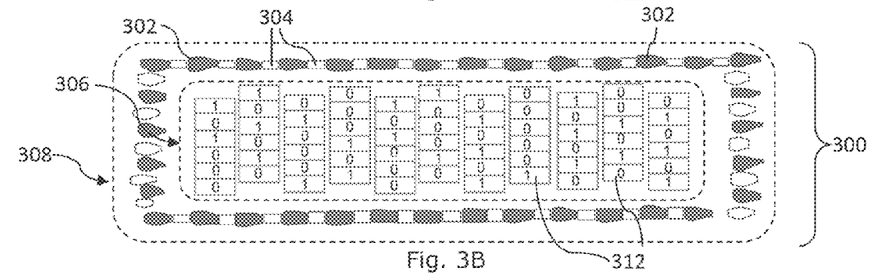
FIG. 3B is a table showing data tabulation corresponding to coded data embedded in the example of FIG. 3.

A woven label 300 as an example of a woven information bearing device is depicted in FIG. 3. The woven label 300 is constructed from warp yarns and weft yarns which are interlaced to form weft elements 302, 312 and warp element 304 as depicted in the schematic diagram of FIG. 3A. The woven label 300 includes an inner portion 306 which is surrounded by an outer portion 308. The inner portion 306 defines a data bearing region comprising the weft elements 312. As depicted in FIG. 3B, the woven elements 302, 312, are distributed inside and outside the data bearing region 306 and do not have uniform shape and/or dimensions. The woven information bearing elements 312 which are inside the data bearing region 306 do not have uniform shape and/or dimensions among themselves. In this example, the label 300 is woven to embed data according to the data tabulation as depicted in FIG. 3B. In this example data tabulation, data cells of uniform shape and dimensions are arranged into columns. Each column comprises 6 rectangular data cells and there are a total of 11 columns, with adjacent columns vertically displaced by the height of about one data cell from each other. By applying a data reading template having the same relative spatial distribution of data cells as that of the data tabulation, the data which are embedded in woven data elements of irregular and/or non-uniform shapes and/or dimensions can be read or retrieved, While the data tabulation comprises data cells and columns of same size and dimensions, the data cells may have different shapes and/or dimensions and/or the data columns may have different shapes and/or dimensions without loss of generality.

In some embodiments, data cells of a data coding grid may be selectively defined with data bearing symbols (or 'data symbols' in short) and non-data bearing symbols. In other words, a data grid defining a data bearing region may contain data cells which are characterised information bearing woven elements and non-information bearing woven elements. Non-information bearing woven elements will also be referred as 'blank elements' or 'blank woven elements' herein.

Figure 4:
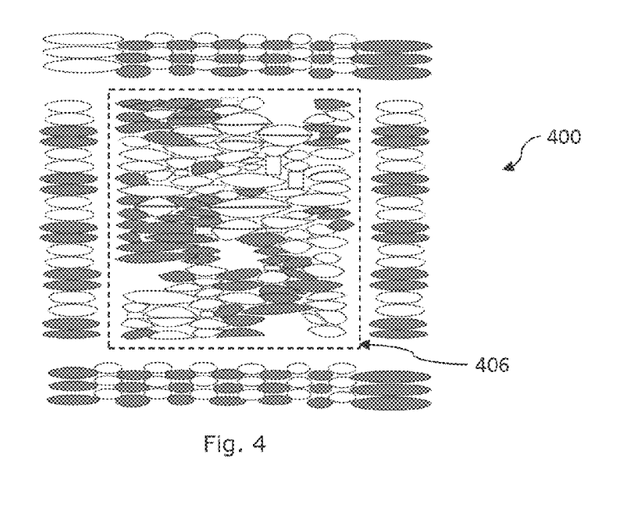
FIG. 4 is an image of an example woven information bearing device according to the present disclosure.
Figure 4A:
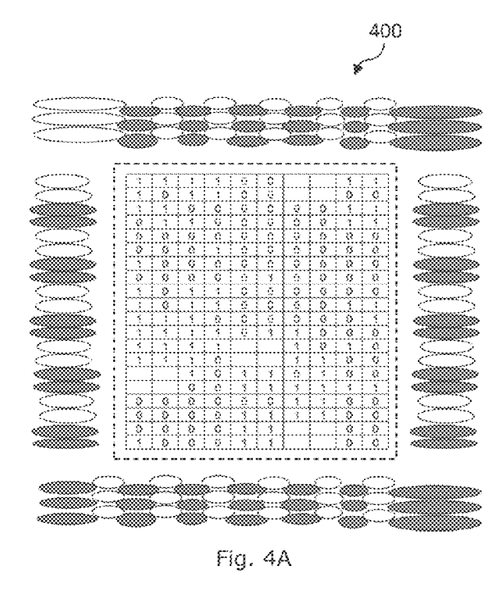
FIG. 4A is a table showing data tabulation corresponding to coded data embedded in an example woven information bearing device according to the present disclosure and showing a first data coding scheme.

A schematic diagram of an example woven label 400 as an example of a woven information bearing device comprising both data bearing symbols and non-data bearing symbols is depicted in FIG. 4. In the example of FIG. 4A, same convention to data representation (black='1', white='0') as that used in FIGS. 1A, 1B, 2B and 2C is used and a data cell not labelled with a data symbol is characterized as a blank cell comprising a blank element. For example, the blank element may be formed of woven elements having non-definitive properties such as non-black and non-white (or surrounding background woven element properties) when black and white woven elements are the ones that are data definitive.

Figure 4B:
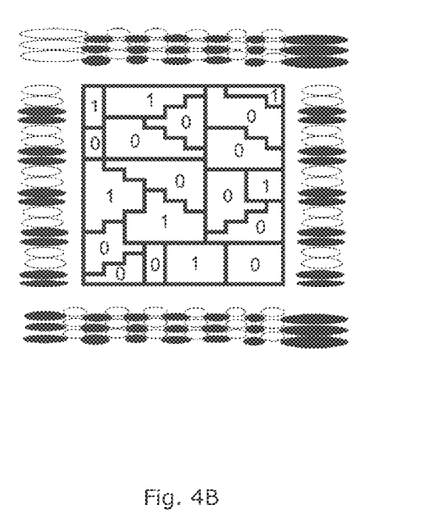
FIG. 4B is a schematic diagram of an example woven information bearing device according to the present disclosure and showing a second data coding scheme.

In some embodiments, data cells of a data coding grid may have non-uniform shapes and/or non-uniform sizes. Using the example woven label 200 as a convenient example, the data coding grid may comprise irregularly shaped and/or sized data cells as depicted in FIG. 4B.

In some embodiments, a data bearing pattern may be double or multiple coded. For example, using the example woven label 200 as a convenient example again, the data bearing pattern delineated by the data bearing region 206 may carry a first set of data coding corresponding to that of FIG. 2D and a second set of data coding according to a coding scheme corresponding to that of FIG. 4B. This coding scheme may be applied as a secondary coding scheme in addition to the primary coding scheme depicted above or as an alternative coding scheme without loss of generality.

When a secondary coding scheme is applied, a secondary set of data defined by a set of secondary data cells will be embedded in the same data bearing pattern. In this coding scheme, the secondary data cells may have uniform shapes and dimensions, or non-uniform shapes and/or non-uniform dimensions as depicted in FIG. 4B. In general, a secondary data cell may be defined by an ensemble of adjacently disposed woven information bearing elements. A secondary data cell may contain one complete woven information bearing element, a part or a portion of a woven information bearing element or portions of adjacently disposed woven information bearing elements.

A woven information bearing element may have multiple data properties in some embodiments to support multiple coding schemes. For example a single woven information bearing element may carry different data symbols, different data formats, and/or different salient data properties. For example, a woven information bearing element in dark red carries a data symbol representing 'red' and 'dark', while, a woven information bearing element in light blue carries a data symbol representing 'blue' and 'light'. Multiple coding of woven information bearing elements open up many possibilities for high density data coding of woven articles such as woven tags or woven labels.

In some embodiments, colored or grey scale coded woven elements may be used for primary coding to facilitate M-nary coding, where M is an integer larger than 2 and grey scale threshold coding to discern between black and white may be used for secondary coding to facilitate binary coding. In addition to the use of different coding schemes, the dominant property of a secondary data cell may also be used to determine its representative data symbol or data value.

Figure 5:
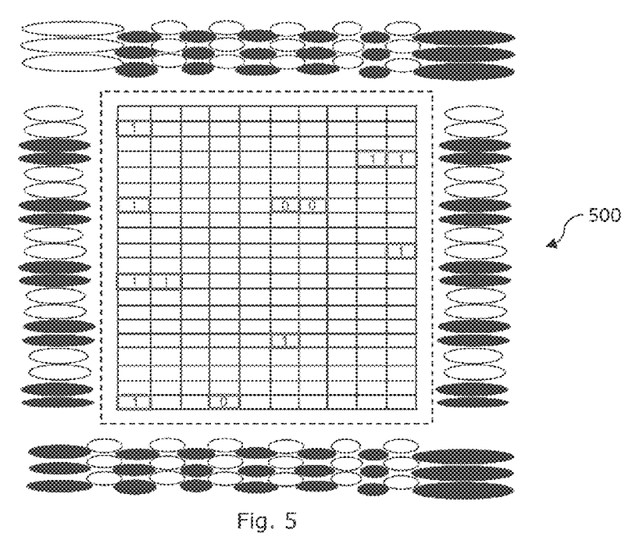
FIG. 5 is a table showing data tabulation corresponding to coded data embedded in showing data tabulation of an example woven information bearing device according to the present disclosure.

In some embodiments, specific information may be coded at specific or selected locations or specific or selected data cells. For example, specific data may be encoded at selected data cells as depicted in the example data tabulation of FIG. 5 of a woven device 500. Such data cells may be part of primary coded data cells and may carry a secondary significance as specific data. Alternatively, such data cells may only carry specific data or meaning and not forming part of the primary coded data. For example, a complete set of data, say 111100111110, may be formed just from such selected data, and this would be of particular use in verification or authentication applications as the specific locations of the useful data may be kept secret. This scheme of assigning designated data cells to represent selected data may be used in addition to primary data coding.

To provide built-in alignment information to facilitate extraction of data elements, each of the example woven information bearing devices of FIGS. 1, 2 and 3 include a reference device formed by weft and/or warp elements. More particularly, the weft and/or warp elements are distributed on the outer portion 108, 208, 308 to define a reference frame or a reference grid. Such a reference device would be of particular use to help extract data, especially from a somewhat distorted woven information bearing device, for example, due to washing, knurling or twisting.

In the example reference device depicted in FIG. 1, alignment elements of weft and warp elements are distributed to define a boundary surrounding the data bearing pattern. The alignment elements are aligned in orthogonal axes and comprise spaced apart dark elements on a light background so that the alignment elements have sufficient contrast to assist software aided re-alignment when necessary. In this example, dark alignment elements are distributed on a light (or white background) at regular intervals along a first axis (Y-axis) which defines length of the device and at regular intervals along a second axis (X-axis) orthogonal to the Y-axis which defines width of the device. The entire data pattern is contained within the alignment frame defined by the alignment elements.

Figure 5A:
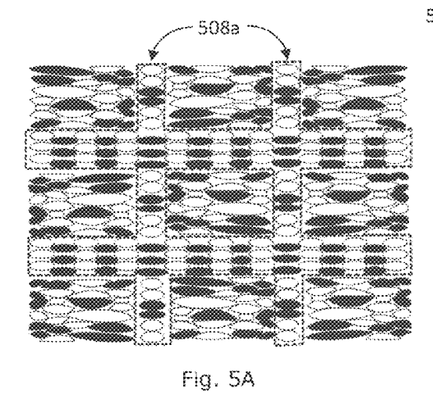
FIG. 5A shows an example woven information bearing device according to the present disclosure having an example reference device.

In some embodiments, a reference device may not have a boundary that contains the entire data pattern. As depicted in FIG. 5A, the example reference device 508a (in dashed box) contains contrasting alignment elements which are distributed along orthogonal axes to define an internal reference grid system to assist data retrieval from distorted woven information bearing devices.

Figure 5B:
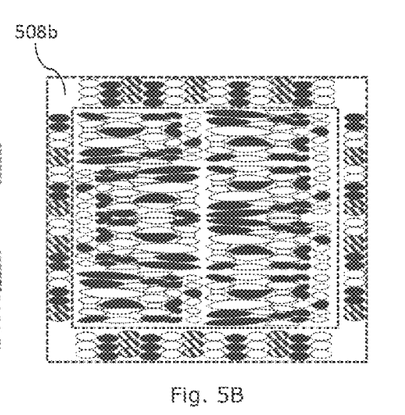
FIG. 5B shows an example woven information bearing device according to the present disclosure having an example reference device.

In some embodiments, a reference device may not have a boundary that contains alternately disposed alignment elements of binary contrast. As depicted in FIG. 5B, the example reference device 508b (in dashed box) contains alignment elements of ternary contrast levels.

Figure 6:
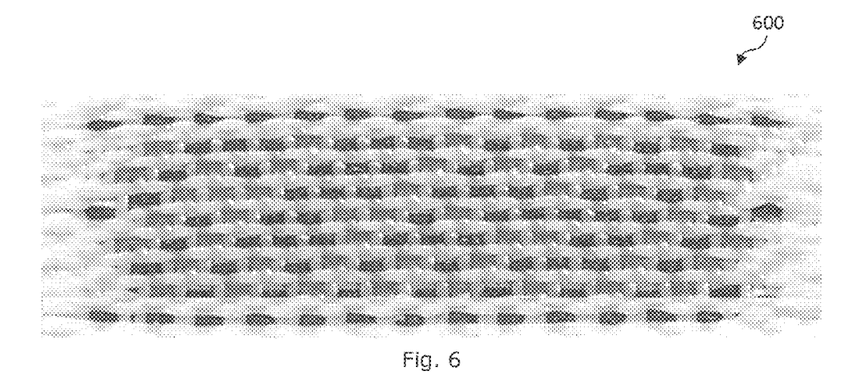
FIG. 6 is an image of an example woven information bearing device according to the present disclosure.
Figure 6A:
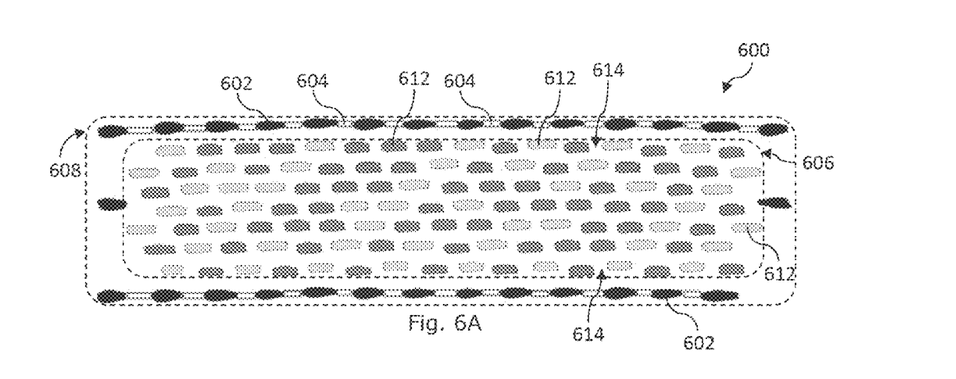
FIG. 6A is a schematic diagram of the example woven information bearing device of FIG. 6.

A woven tag 600 depicted in FIG. 6 illustrates an example woven information bearing device that is constructed from warp yarns and weft yarns which are interlaced to form weft elements 602, 612 and warp elements 604, 614, as shown in the schematic diagram of FIG. 6A. The woven label 600 includes an inner portion 606 which is surrounded by an outer portion 608. The inner portion 606 defines a data bearing region comprising data bearing weft elements 612 and non-data bearing warp elements 614.

The weft 612 and warp 614 elements in the data bearing region 606 are distributed into a plurality of I data element rows each comprising $J_{odd}$ or $J_{even}$ woven data elements for odd and even rows respectively, where I=7 and $J_{odd}$=16 and $J_{even}$=17. Each data element row is substantially linear and each woven data element is a weft element 612 coded into either green or red. Warp elements 614, which are intermediate between and adjacent to woven weft data element, do not carry data and may be used as alignment or reference elements. The woven data elements are of substantially uniform shape and dimensions, and the width of a woven weft data element define a pitch. Weft data elements on alternative rows are laterally shifted or offset by half a pitch so that the woven weft data elements are not aligned on linear columns.

The outer portion 608 comprises weft and warp elements which are arranged to form a reference frame or a reference grid. The reference frame or the reference grid in this example is in the shape of a closed rectangle to facilitate recovery of data in the data bearing region when the woven label 600 is subject to lateral and/or longitudinal and/or bending distortion.

To retrieve the data elements from the coded weft data elements, data coding grid at half pitch width or the intermediate warp elements may be used as alignment reference.

In some embodiments, the woven data elements may be of non-uniform shapes and/or non-uniform widths and/or non-uniform dimensions without loss of generality.

Figure 7:
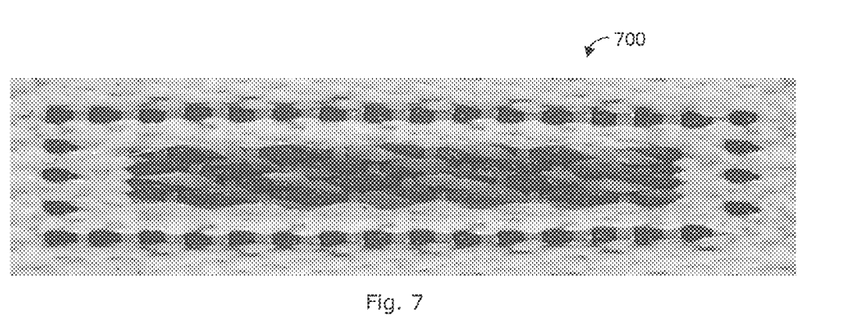
FIG. 7 is an image of an example woven information bearing device according to the present disclosure.
Figure 7A:
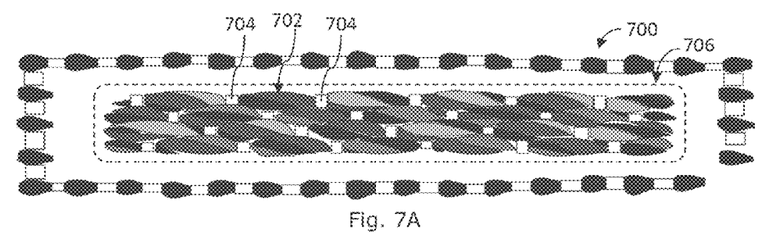
FIG. 7A is a schematic diagram of the example woven information bearing device of FIG. 7.

An example woven tag 700 depicted in FIG. 7 is constructed from warp yarns and weft yarns which are interlaced to form weft elements 702 and warp elements 704, as shown in the schematic diagram of FIG. 7A. The woven label 700 includes an inner portion 706 which is surrounded by an outer portion. The inner portion 706 defines a data bearing region which comprises weft elements 702 and warp elements 704.

The data bearing region of FIG. 7A comprises 4 rows of woven data elements. Each woven data element is a weft element 702 which is part of a weft member. Each weft member is constructed from three sub-members, each with a colour which is in good contrast to the colour of other sub-members. Each sub-member may be a thread or a bundle of finer twisted threads. The sub-members are twisted together at variable pitches to define different data elements along a weft member. Each woven data weft element 702 in this example comprises a plurality of data sections.

In this example, the weft member on the lowest data row is formed from three constituting sub-members, namely, 'blue', 'yellow' and 'red' sub-members. The first weft data element from the left edge on this lowest row has two data sections, namely, a red data section and a yellow data section. The weft data element which is immediately adjacent to this first weft member has three data sections, namely, a red data section, a yellow data section and a blue data section. The weft member on the second lowest data row is formed from three constituting sub-members, namely, 'red', 'green' and 'blue' sub-members. Each woven data element has one to four data sections and each boundary delineating adjacent data sections has a spiral outline due to the formation of the weft member by twisting together of the sub-members. Different data sections representing different data symbols can be formed on different weft portions of the weft member by setting variable pitches according to the data pattern to be formed. In this example, weft elements on adjacent rows are laterally shifted by half a pitch. The weft data elements are of same or substantially same dimensions. The warp elements define boundaries for weft data elements. To facilitate data retrieval, the warp elements can be used as alignment reference guides to assist compiling of data symbols.

Figure 7B:
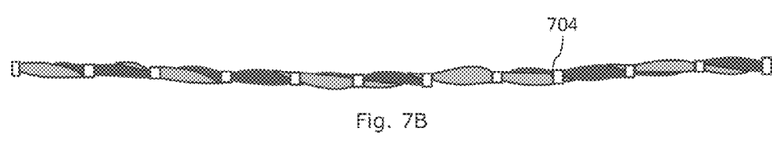
FIG. 7B is a schematic diagram of an example weft member according to the present disclosure.

An example weft member formed from two constituting sub-members is depicted in FIG. 7B. Each weft data element has one to three data sections and a boundary delineating adjacent data sections has a spiral outline due to the formation of the weft member by twisting together of the sub-members.

While the example weft data elements have uniform pitches, the weft data elements can have non-uniform pitches or widths without loss of generality. Similarly, weft data elements on adjacent rows may not need to off-set and may be aligned, or a mixture of both.

Figure 8:
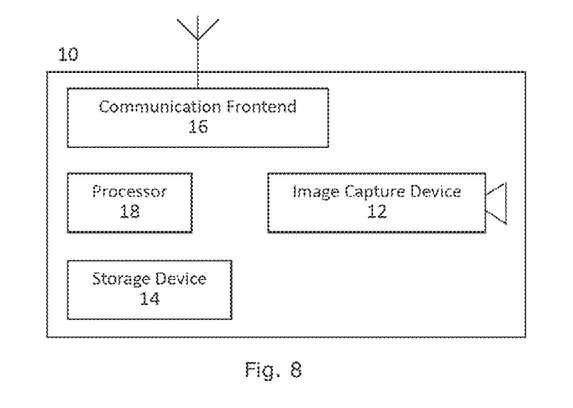
FIG. 8 is a block diagram of an example woven device capturing apparatus.

In use, a user such as a consumer when like to make an inquiry will capture an image of the example woven label 100 using a woven device image capturing apparatus 10 to retrieve and optionally utilise data contained in the woven label 100. An example woven device image capturing apparatus 10 adapted to recover data embedded in the woven label 100 is depicted in FIG. 8 and comprises an image capturing device 12, a storage device 14 including volatile memory such as RAM and non-volatile memory such as ROM, EEPROM or flash memory, a communication frontend 16 which is adapted to communicate with a data network, a processor 18 such as a microprocessor configured to execute stored instructions to recover information embedded in the woven label 100.

Figure 9:
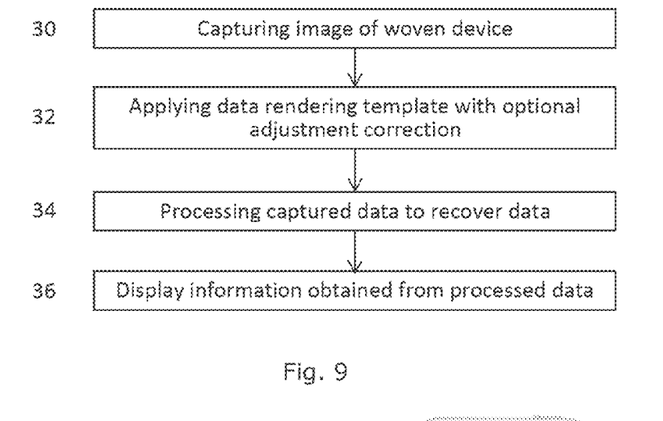
FIG. 9 is an example flow diagram to recover data embedded an example information bearing device.
Figure 9A:
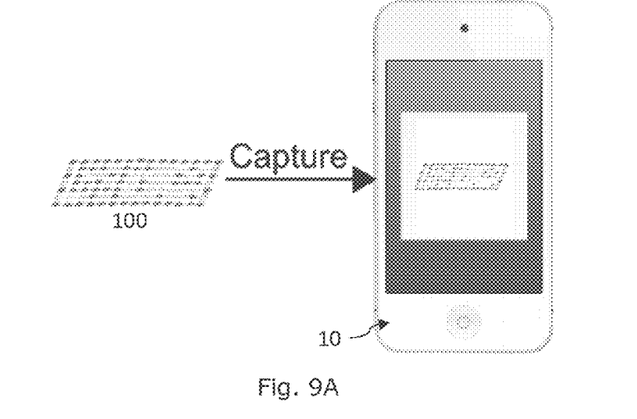
FIG. 9A is a schematic representation of an example woven device capturing apparatus displaying an image of a captured woven information bearing device.
Figure 9B:
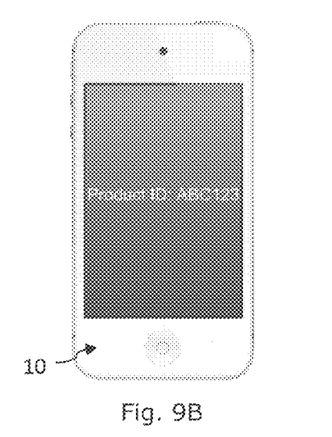
FIG. 9B is a schematic representation showing data displayed on the example woven device capturing apparatus of FIG. 9A.

Referring to FIG. 9, a user captures an image of the example woven label 100 using a woven device image capturing apparatus 10 at 30. The image of the example woven label 100 is displayed on the example woven device image capturing apparatus 10 as depicted in FIG. 9A. The processor 18 is to optionally examine whether the data bearing region 106 has been distorted with reference to the reference frame or the reference grid on the outer portion 108 and proceeds to restore the data bearing region 106 by utilising a correction algorithm and with reference to the extent of distortion at 32. The processor 18 then proceeds to extract data embedded or coded or formed in the data bearing region 106 at 34 and to process data for display at 36. The information obtained from processed data is then displayed on the example woven device image capturing apparatus 10 as depicted in FIG. 9B.

In some embodiments, the embedded data may contain useful data such as product information and linkage to useful resources such as websites, and the apparatus 10 will output such information or establish such links.

In some embodiments, the embedded data may contain authentication data which are verifiable by the apparatus 10 and the apparatus 10 will output outcome of verification.

In some embodiments, the embedded data may be recovered using a reference template. An example reference template comprises a reference grid which is devised with reference to the reference frame or the reference grid on the outer portion 108, after restoration or correction where necessary. By application of a data retrieval template, data embedded in the data bearing region 106 can be more expeditiously recovered.

While the present disclosure has been described with reference to example and example embodiments, the example and example embodiments are to assist understanding by persons skilled in the art and shall not be used to limit the scope of disclosure.

The invention claimed is:

1. A woven information bearing device comprising a plurality of woven elements,
   wherein the plurality of woven elements is machine woven and comprises a plurality of woven data bearing elements,
   wherein the woven data bearing elements are arranged to form a woven information bearing pattern and a data bearing region,
   wherein each woven data bearing element is coded to represent one data element, a plurality of data elements, or a portion of a data element,
   wherein each said data element represents a data, a data including a data symbol, a data sign or a data value,
   wherein the woven information bearing device includes a reference frame or a reference grid to facilitate recovery of data in the data bearing region when the woven information bearing device is subject to distortion in the first direction, distortion in the second direction, or distortion in both the first direction and the second direction, and
   wherein the reference frame or the reference grid is formed of machine woven weft elements and warp elements.

2. The woven information bearing device according to claim 1,
   wherein the woven data bearing elements in the data bearing region are woven, coded and distributed or tabulated according to a data table to form the data bearing region, the data table defining the data embedded in the data bearing region and comprising a plurality of data cells and defining tabulation and spatial distribution characteristics of the woven data bearing elements and the data elements.

3. The woven information bearing device according to claim 1,
   wherein the woven data bearing elements in the data bearing region are woven to embed data coded and distributed or tabulated according to a data defining grid which comprises a plurality of intersecting lines,
   wherein the intersecting lines intersect to partition the data bearing region into a plurality of data cells, and each data cell is coded with a data element so that the data elements of the data defining grid define data embedded in the data bearing region, and
   wherein the woven data bearing elements are distributed such that a data cell contains a single woven data bearing element, a portion of a single woven data bearing element, a plurality of adjacently disposed woven data bearing elements, a plurality of portions of a plurality of adjacently disposed woven data bearing elements, or a combination thereof.

4. The woven information bearing device according to claim 1,
   wherein a woven data bearing element is color coded, shape coded, or coded in color and shape, and
   wherein shape coded woven data bearing elements have different shapes, different dimensions, or different shapes and dimensions.

5. The woven information bearing device according to claim 4,
   wherein the shape coded woven data bearing elements have irregular shapes, non-uniform shapes, non-uniform dimensions, or any combination of irregular shapes, non-uniform shapes, non-uniform dimensions.

6. The woven information bearing device according to claim 4,
   wherein the woven data bearing elements have same shape, same or different dimensions, or same shape and same or different dimensions.

7. The woven information bearing device according to claim 1,
   wherein the plurality of woven data bearing elements forming the data bearing region is coded to form a first set of data elements according to a first coding scheme, and
   wherein the plurality of woven data bearing elements forming the data bearing region is coded to form a second set of data elements according to a second coding scheme.

8. The woven information bearing device according to claim 7,
   wherein a woven data bearing element has a first data property carrying a first data meaning according to the first coding scheme, and the woven data bearing element has a second data property carrying a second data meaning according to the second coding scheme.

9. The woven information bearing device according to claim 8,
   wherein the first data property is in shape or dimensions, and the second property is in color or grey level.

10. The woven information bearing device according to claim 7,
    wherein the data bearing region is partitioned according to a first partitioning scheme to define a plurality of first data cells according to the first coding scheme, each first data cell defining a first data element representing a data, and wherein the data bearing region is partitioned according to a second partitioning scheme to define a plurality of second data cells according to the second coding scheme, each second data cell defining a second data element representing a data.

11. The woven information bearing device according to claim 1, wherein the woven data bearing element is M-nary coded, M including 2, 3, 4, and 5.

12. The woven information bearing device according to claim 1, wherein the woven data bearing element comprises a plurality of optically recognizable twisted data sections, and adjacent twisted data sections of a woven data bearing element are delineated by a salient boundary, including a spiral-shaped boundary.

13. The woven information bearing device according to claim 12, wherein each data section represents one data element, a plurality of data elements, or a portion of a data element.

14. The woven information bearing device according to claim 1, wherein the woven information bearing elements comprises weft elements, warp elements, or both weft elements and warp elements; wherein a weft element extends in a first direction and a warp element extends in a second direction which is orthogonal to, substantially orthogonal to, or at an angle to the first direction; and wherein a warp element is intermediate two adjacent weft elements and a weft element is intermediate two adjacent warp elements.

15. A method of reading data from a woven information bearing device, the woven information bearing device comprising a plurality of woven elements:

wherein the plurality of woven elements is machine woven and comprises a plurality of woven data bearing elements, wherein the woven data bearing elements are arranged to form a woven information bearing pattern and a data bearing region, wherein each woven data bearing element is coded to represent one data element, a plurality of data elements, or a portion of a data element, wherein each said data element represents a data, a data including a data symbol, a data sign or a data value; and wherein the woven information bearing device includes a reference frame or a reference grid to facilitate recovery of data in the data bearing region when the woven information bearing device is subject to distortion in the first direction, distortion in the second direction, or distortion in both the first direction and the second direction, wherein the reference frame or the reference grid is formed of machine woven weft elements and warp elements, wherein the method comprises using the reference frame or the reference grid as an alignment device to facilitate retrieval of data embedded in the data bearing region, and wherein the method comprises:
capturing an image of the woven information bearing device,
applying a data reading template to retrieve data coded or formed on the woven information bearing pattern, and
processing the data with reference to the data reading template and displaying result of processing.

16. The method according to claim 15, wherein the woven data bearing elements in the data bearing region are woven to embed data coded and distributed or tabulated according to a data defining grid which comprises a plurality of intersecting lines, wherein the intersecting lines intersect to partition the data bearing region into a plurality of data cells, and each data cell is coded with a data element so that the data elements of the data defining grid define data embedded in the data bearing region, wherein the data reading template comprises a plurality of data reading cells spatially corresponding to the plurality of data cells of the data defining grid, and wherein the method comprises applying the data reading template to facilitate retrieval of data embedded in the data bearing region.

17. An apparatus for retrieving data coded or embedded on a woven information bearing device, wherein the woven information bearing device comprises a plurality of woven elements, the plurality of woven elements being machine woven and comprising a plurality of woven data bearing elements:

wherein the woven data bearing elements are arranged to form a woven information bearing pattern and a data bearing region, wherein each woven data bearing element is coded to represent one data element, a plurality of data elements, or a portion of a data element, wherein each said data element represents a data, a data including a data symbol, a data sign or a data value, wherein the woven information bearing device includes a reference frame or a reference grid to facilitate recovery of data in the data bearing region when the woven information bearing device is subject to distortion in the first direction, distortion in the second direction, or distortion in both the first direction and the second direction, wherein the reference frame or the reference grid is formed of machine woven weft elements and warp elements, wherein the microprocessor is to apply the reference frame or the reference grid as an alignment device to facilitate retrieval of data embedded in the data bearing region, and when necessary to restore a distorted woven information bearing device to facilitate retrieval of embedded data for subsequent processing of embedded data and display, wherein the apparatus comprises a solid state memory to store an image of the woven information bearing device, and a solid state microprocessor configured to execute stored instructions to recover data or information embedded in the woven information bearing device from the image, and wherein the microprocessor is to apply a data reading template to retrieve data coded or formed on the woven information bearing pattern, and to processing the data with reference to the data reading template and to display result of processing.

18. The apparatus according to claim 17, wherein the woven data bearing elements in the data bearing region are woven to embed data coded and distributed or tabulated according to a data defining grid which comprises a plurality of intersecting lines, wherein the intersecting lines intersect to partition the data bearing region into a plurality of data cells, and each data cell is coded with a data element so that the data elements of the data defining grid define data embedded in the data bearing region, and the data reading template comprises a plurality of data reading cells spatially corresponding to the plurality of data cells of the data defining grid, and wherein the microprocessor is to apply the data reading template to facilitate retrieval of data embedded in the data bearing region.

\* \* \* \* \*